May 19, 1925.

H. R. BORCHARDT

SIGNAL

Filed July 28, 1921

May 19, 1925. 1,538,378
H. R. BORCHARDT
SIGNAL
Filed July 28, 1921 7 Sheets-Sheet 2

Inventor
H. R. Borchardt
By Eccleston & Eccleston
Attorneys

May 19, 1925. 1,538,378
H. R. BORCHARDT
SIGNAL
Filed July 28, 1921 7 Sheets-Sheet 3

May 19, 1925. 1,538,378
H. R. BORCHARDT
SIGNAL
Filed July 28, 1921 7 Sheets-Sheet 4

May 19, 1925.  
H. R. BORCHARDT  
SIGNAL  
Filed July 28, 1921

H. R. BORCHARDT

SIGNAL

Filed July 28, 1921   7 Sheets-Sheet 7

Inventor

H. R. Borchardt

By Eccleston + Eccleston

Attorneys

Patented May 19, 1925.

1,538,378

UNITED STATES PATENT OFFICE.

HERBERT R. BORCHARDT, OF HOLLYWOOD, CALIFORNIA.

SIGNAL.

Application filed July 28, 1921. Serial No. 488,217.

*To all whom it may concern:*

Be it known that I, HERBERT R. BORCHARDT, a citizen of the United States, residing at Hollywood, Los Angeles, in the county of Los Angeles and State of California, have invented certain new and useful Improvements in Signals, of which the following is a full, clear, and exact description.

My invention relates to signals for automobiles, motor boats, aeroplanes, etc., but is more particularly intended for automobiles, and has for its object to provide such a device to be attached at or near the dashboard where it can be easily observed by the operator, as well as by pedestrians, either in front or behind the machine, and by the drivers of other automobiles.

Another object of the invention is to provide such a signal which is telescopic in structure and may be extended or collapsed at will.

Another object of the invention is to provide such a device which is suitably wired and provided with electric light so that it may be used at night, and wherein contacts are provided for automatically closing the proper circuits when so used.

Another object of the invention is to provide a signal arm which may be raised or lowered or held horizontal, either electrically or mechanically, to indicate the driver's intention to turn to the right or left or to stop.

Another object of the invention is to provide such a signal arm in which a plurality of lights are arranged lengthwise of the arm in order that its angular position may be determined at night.

Other objects and advantages of the invention will be apparent from the following description when taken in connection with the accompanying drawings, in which:

Figure 11 is a similar section, the arm being collapsed.

Figure 11$^a$ is a detail view of the gearing.

Figure 1:
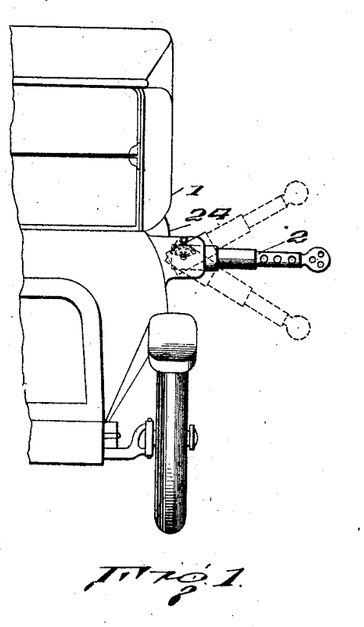
Figure 1 is a fragmentary view of an automobile equipped with my signal.

Referring to the drawing more in detail the numeral 1 designates an automobile to which my signal 2 is attached. The signal comprises an arm composed of three telescopic sections 3, 4 and 5. These three sections although differing in shape in some instances, are common to each of the modified forms shown. The three sections when not in use are collapsed as shown in Figs. 2 and 4.

To extend the sections of the arm I have provided extension transmission cables 6 and 7. The cables 6 are attached to the drums 8 on the shaft 9 and extend over pulleys 10, and are then attached adjacent the lower end of the intermediate section 4. Cables 7 are secured to the lower end of section 3, pass over pulleys 11 carried by the intermediate section 4 and are secured to the base of the outer section 5. A drum 12 is also carried on shaft 9, and to this drum is secured a return transmission cable 13, the opposite end of this cable being secured to the base of the outer section 5. It should be here noted that the drum 12 is of twice the diameter of drums 8, and also that drum 12 is wound in a direction opposite to drums 8.

Figure 2:
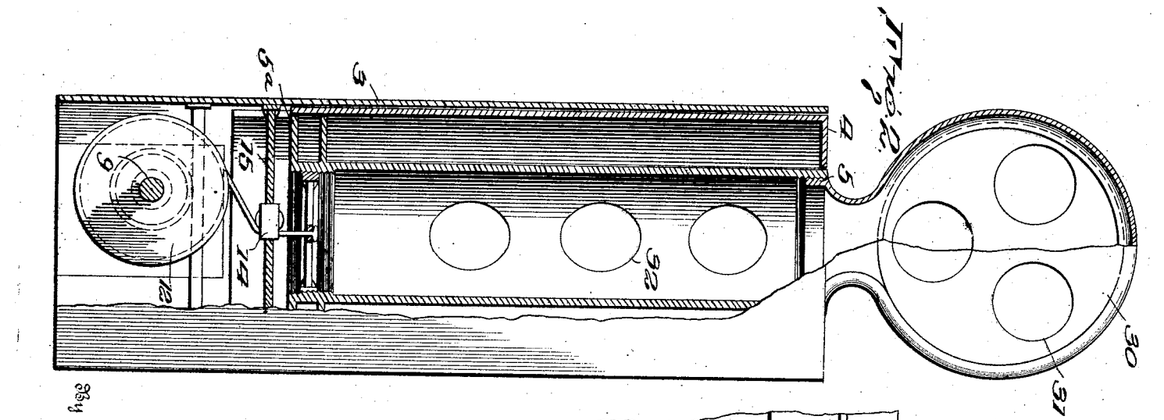
Figure 2 is a part sectional view of the signal arm in collapsed position.
Figures 3, 4, 5:
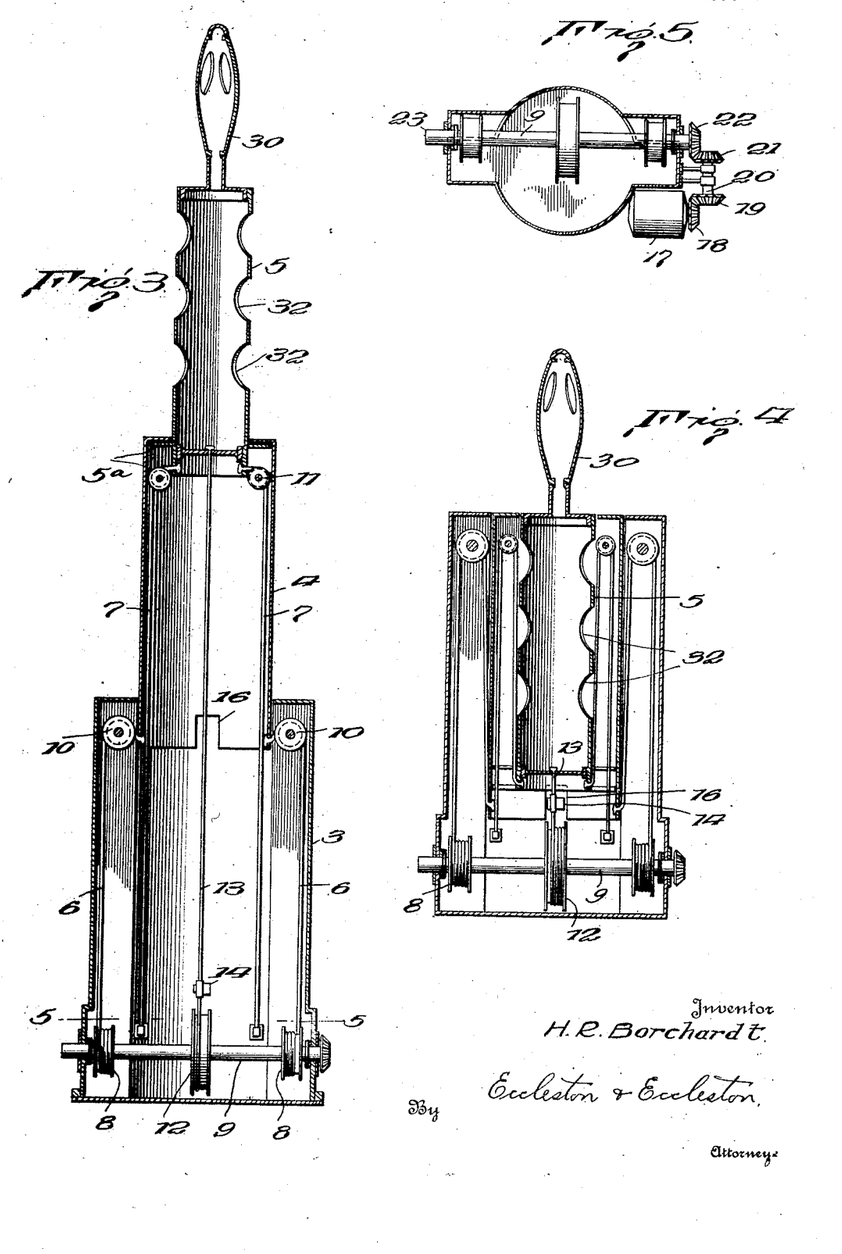
Figure 3 is a longitudinal section through the signal arm, the arm being extended.
Figure 4 is a view similar to Fig. 3, the arm being collapsed.
Figure 5 is a section taken on line 5—5, Fig. 3.
Figure 6:
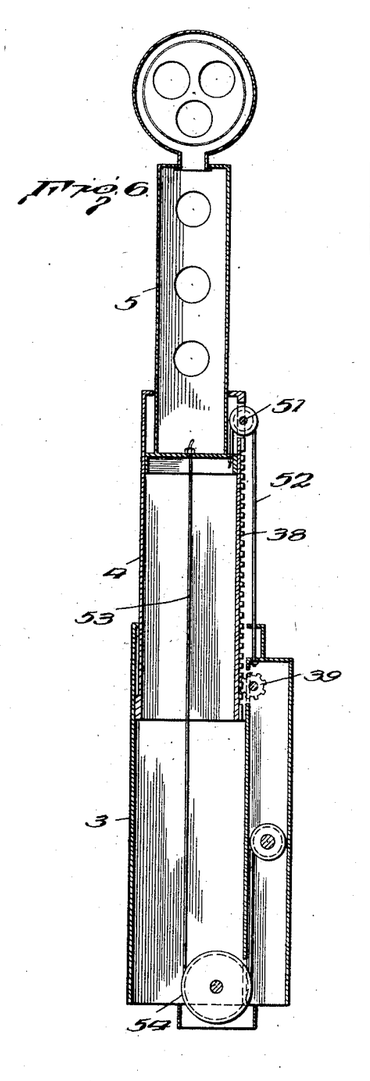
Figure 6 is a longitudinal section through a slightly modified form of signal arm.
Figures 7, 9:
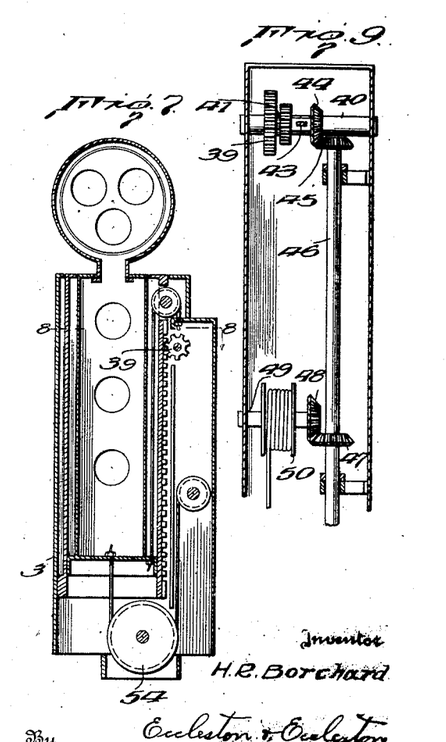
Figure 7 is a section through the arm shown in Fig. 6, the arm being collapsed.
Figure 9 is an enlarged fragmentary section on line 9—9, Fig. 8.
Figure 8:
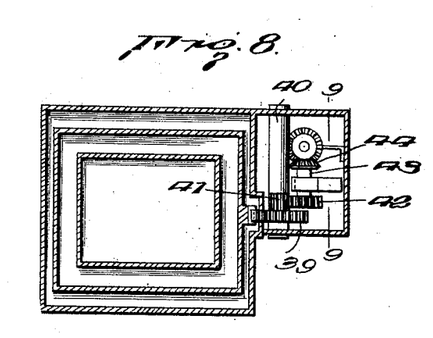
Figure 8 is an enlarged cross section taken on line 8—8, Fig. 7.

To extend the arm 2 from the collapsed position shown in Figs. 2 and 4 to the extended position shown in Fig. 3, it is only necessary to turn shaft 9 in the proper direction. This movement causes drums 8 to wind up the cables 6 and thereby extend section 4. Through the extension of section 4, the cables 7 extend the outer section 5 twice the distance through which the section 4 is moved. In this manner the arm is completely extended.

To retract the arm 2, the shaft 9 is turned in a reverse direction, and the drum 12 winds up the return transmission cable while drums 8 unwind to permit the arm to collapse. For the purpose of rigidity in operation, the section 5 is provided with the flanges 5ª.

To maintain the return transmission cable in the center line of the arm 2, I have provided the guide block 14, which is mounted on stay rod 15. Intermediate section 4 is cut-away at 16 to accommodate stay rod 15 when the arm is completely collapsed.

The shaft 9 for extending and collapsing the arm 2 may be operated either electrically or mechanically. For the purpose of electrical operation I have provided the motor 17 which may be controlled by means of buttons 17ª and 17ᵇ on the steering post. The spindle of motor 17 carries a bevel gear 18 in mesh with bevel gear 19 on shaft 20. The opposite end of shaft 20 carries a bevel gear 21 which meshes with bevel gear 22 on the shaft 9. Should it be desired to extend and collapse the arm mechanically due to the failure of electricity or for any other reason, an extension 23 of the shaft 9 may be provided with a crank arm or wheel (not shown).

To open the circuit when the signal arm 2 has been extended the desired amount the intermediate section 4 is provided with a sliding contact (not shown). The retracting circuit is also provided with a sliding contact for a similar purpose.

Figure 17:
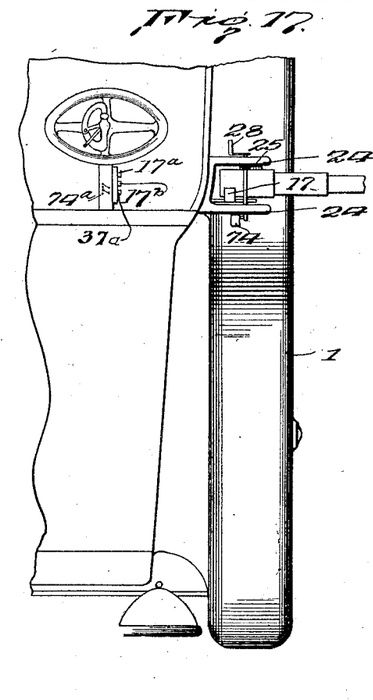
Figure 17 is a framentary plan view of an automobile showing my signal in extended position.
Figure 18:
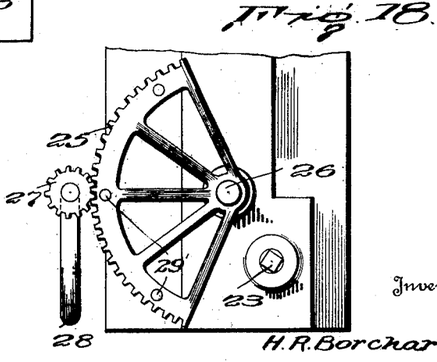
Figure 18 is a fragmentary view of the elevating mechanism.
Figure 20:
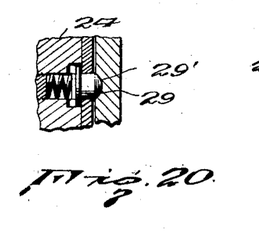
Figure 20 is a detail section of a latch mechanism.

The arm 2 as a whole is mounted on brackets 24—24 adjacent the driver's seat, and may be raised or lowered or placed in horizontal position by means of the toothed segment or rack 25 rigidly mounted on shaft 26 of the signal. Pinion 27 is in mesh with the toothed segment 25 and is provided with an operating handle 28. Suitable spring stops 29 (Fig. 20) are provided on bracket 24 for engaging depressions 29′ on the segment 25 and thereby releasably hold the signal arm in its adjusted position. It will be understood of course that a motor 74 with limit contacts may be used, if desired, in place of the manually operated crank arm 28. A reversing switch 74ª (Fig. 17) is shown for controlling the motor.

Figure 19:
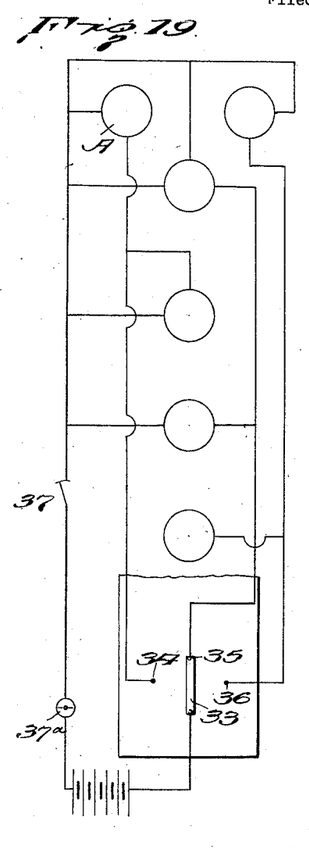
Figure 19 is a diagrammatic view of the electric circuits.

For use at night it is essential that the signal should be lighted. To this end I have provided the outer section 5 with a substantially disc-shaped head 30 formed with three openings 31 on each side. The body of the outer section is likewise provided with three openings 32, extending through both side walls. Located behind these openings 31 and 32 are electric bulbs (not shown). The bulbs in the head 30 each have a distinctive color, for instance, one being red, one yellow and the other green. The three bulbs in section 5 are formed with the same three colors. The two bulbs of the same color are placed in the same circuit, three circuits being provided. These circuits are closed and opened automatically as the signal arm 2 is moved to its different positions. Referring to the diagrammatic view shown in Fig. 19, 33 is a stationary contact while the arm 2 carries the three contacts 34, 35 and 36. Numeral 37 indicates sliding contacts for closing the lighting circuits when the signal is extended and breaking them when the signal is collapsed. Reference character 37ª is a switch for shutting off the lights during the day. Letter A designates the electric bulbs.

The circuits are arranged so that when the signal arm is in horizontal position the yellow bulbs will be lighted; in the upper position the green bulbs will be lighted, and in lower position the red bulbs will be lighted.

Figs. 6, 7, 8 and 9 show a modified form of the invention. In this form of the invention the sections 3, 4 and 5 of the signal arm 2 are square instead of circular. On the lower side of the intermediate section 4 is secured the rack 38. In mesh with the rack 38 is a pinion 39 carried by shaft 40, the latter being rotatably mounted in an extension of the inner base section 3. Shaft 40 also carries a gear wheel 41 in mesh with gear wheel 42 on shaft 43. Also mounted on shaft 43 is a bevel gear 44 in mesh with bevel gear 45 on shaft 46; a bevel gear 47 secured on shaft 46 is in mesh with bevel gear 48 mounted on shaft 49. On shaft 49 is also mounted the retracting drum 50.

Pulley 51 is mounted on the outer end of the intermediate section 4, and over this pulley extends the cable 52, one end of which is anchored to the base of the outer section 5, the other end being anchored to the outer end of the base section 3. The retracting transmission cable 53 is also attached to the base of the outer section 5 and extends thence around the guide pulley 54 and is secured to the winding drum 50. Shaft 46 of course may be operated by motor or by hand in the same manner as described in connection with the form shown in Figs. 1 and 5.

In this form of the invention closing the motor circuit causes rotation of the pinion 39 and extension of intermediate section 4, and through cable 52 an extension of section 5. A reverse movement of the operating mechanism causes drum 50 to wind up the retracting transmission cable and thus collapse the signal arm 2.

The lighting arrangement for this form of the invention and for the other forms to be later described is identical with that described in connection with Figs. 1 to 5. This form of the invention is also provided with sliding or limiting contacts as described in connection with Figs. 1 to 5. An advantage of the foregoing arrangement of the parts is that the signal is made smaller than is possible in the form previously described.

Figure 10:
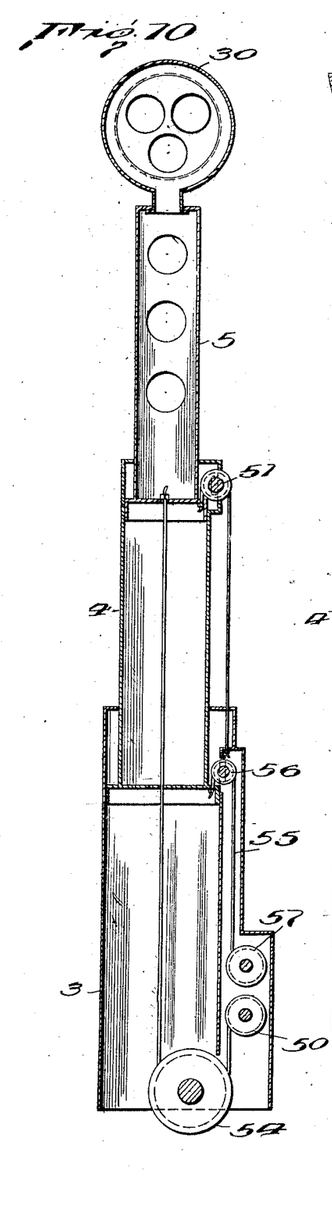
Figure 10 is a longitudinal section through a modified arm, the arm being extended.
Figures 11, 11A:
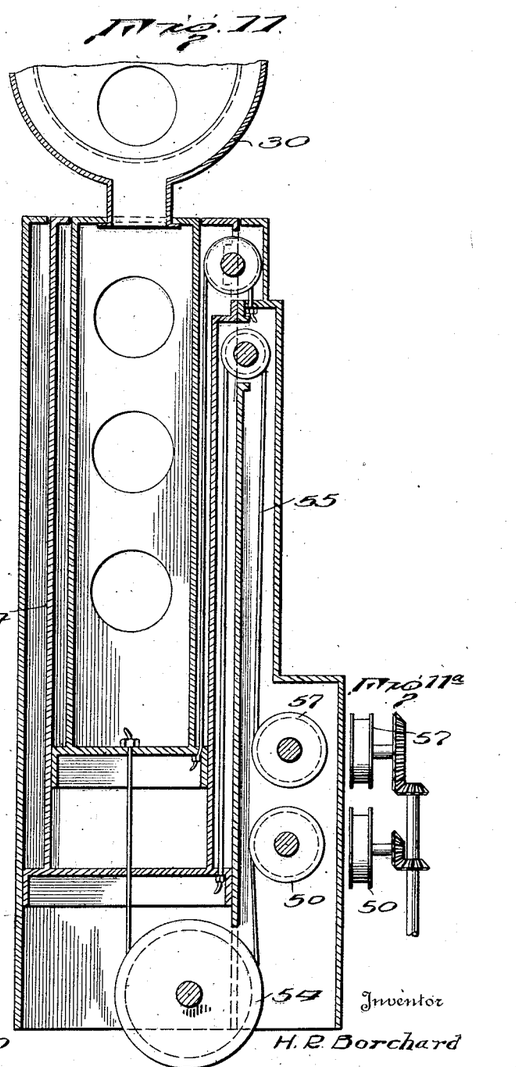

In Figs. 10 and 11 I have shown a slightly modified form of the invention. This form is identical with the disclosure in Figs. 6 to 9 inclusive except that a transmission cable 55, pulley 56 and drum 57 have been substituted for the rack and pinion there described.

Figure 12:
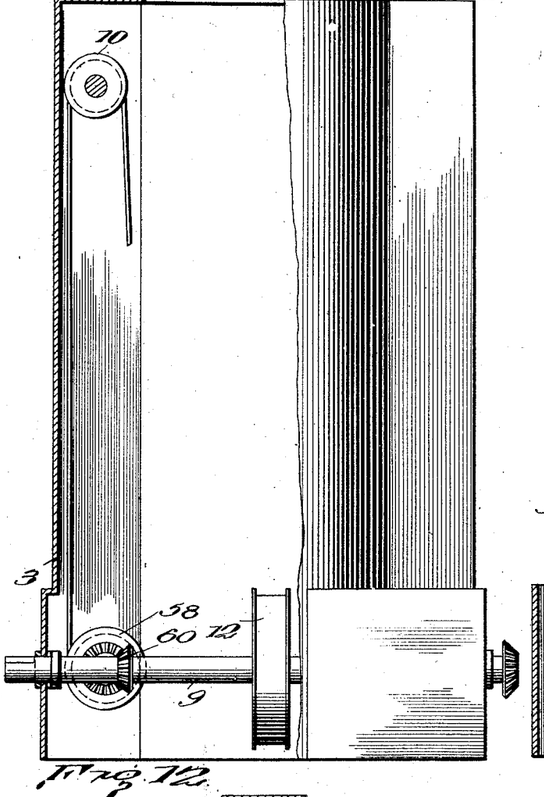
Figures 12, 13 and 14 are sections through a modified form of extension transmission.
Figure 13:
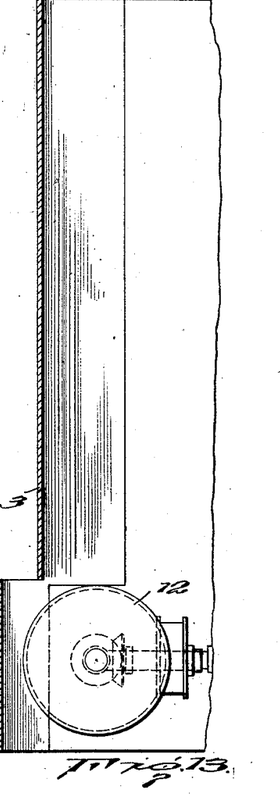
Figure 14:
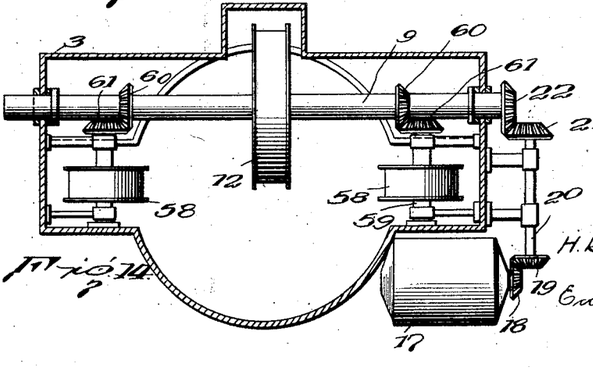

The modified form shown in Figs. 12, 13 and 14 is substantially the same as that shown in Figs. 1 to 5 inclusive. In this form however the winding drums 58 instead of being on the main shaft have been placed on stub shafts 59 operated by bevel gears 60 and 61 from the main shaft 9. By so arranging the winding drums 58 they are located in the same plane with the pulleys 10. In this form also the winding drum 12 has been moved slightly to one side so that one edge of the drum is in the center line of the arm 2, and the guide pulley 14, shown in Fig. 2, may be dispensed with.

Figure 15:
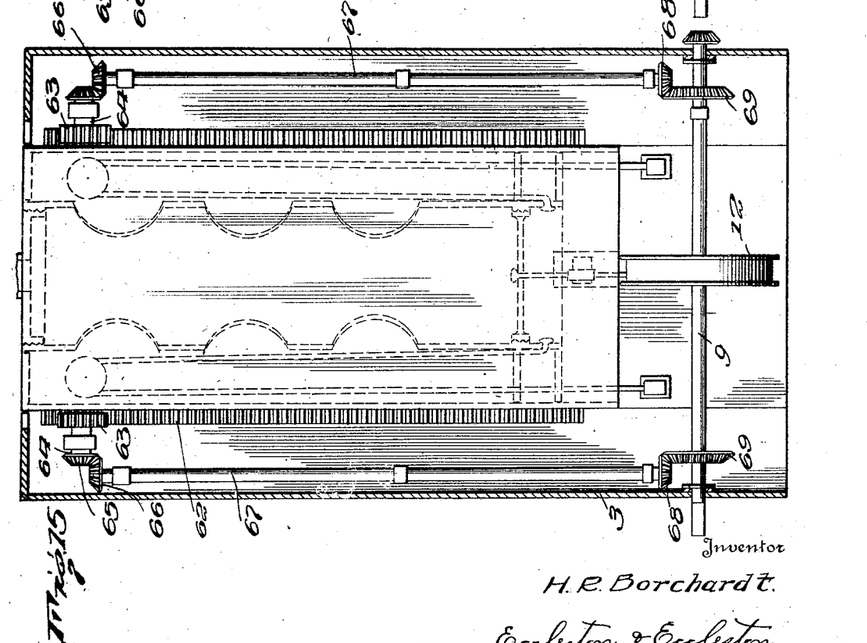
Figure 15 is a section through the base section of a modified form of arm.
Figure 16:
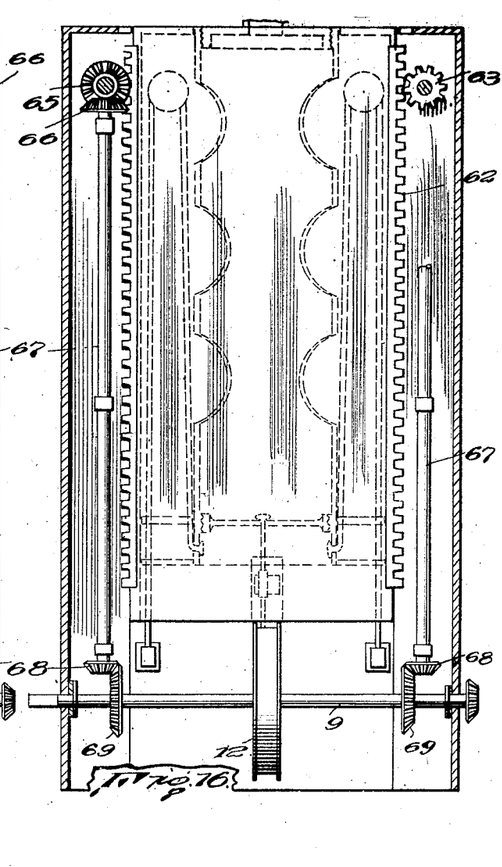
Figure 16 is a section similar to Fig. 15, showing a slightly modified base section.

In the form shown in Figs. 15 and 16, the intermediate section 4 is raised and lowered by means of a rack and pinion 62 and 63 respectively. The pinion 63 is mounted on a stub shaft 64 and is operated through bevel gears 65, 66 and 67, and bevel gears 68 and 69 from the motor operated shaft 9. In the form of the invention shown in Fig. 15, one side of the rack is secured to section 4, the teeth extending either up or down as desired, while in Fig. 16 the base of the rack is secured to section 4 with the teeth extending laterally of the arm 2; the pinion 63 in this instance rotating in a substantially horizontal plane.

While I have shown only a single arm on the drawing it is to be understood that an arm may be placed on each side of the car and raised or lowered by a common operating lever. In such case couplings will be installed so that either arm may be disconnected.

Assuming the arm 2 collapsed and in horizontal position; if the driver intends to stop the machine he presses button 17ª which through motor 17 extends the signal arm. The arm may then be retracted by pressing button 17ᵇ. If the machine is being operated after dark the switch 37ª should be closed so that when the arm is extended the sliding contacts will complete the circuits and light the electric bulbs in the arm. On turning to right or left the switch 74ª is also operated to raise or lower the arm 2, and in so doing it closes the circuit through the green or red lights with which the arm is equipped.

In accordance with the patent statutes I have described what I now believe to be the best embodiment of my invention, but I do not wish to be understood thereby as limiting myself or the scope of the invention, as many changes and modifications may be made without departing from the spirit of the invention, and all such I aim to include in the scope of the appended claims.

What I claim as new and desire to secure by Letters Patent is:—

1. In a direction signal, a plurality of slidable sections, and means operable by movement of an inner section for moving the next outer section at an increased rate of speed.

2. In a direction signal, a plurality of telescoping sections, each section being operatively connected with the next outer section whereby movement of any section moves the next outer section at twice its own rate of speed.

3. A direction signal comprising a plurality of relatively slidable sections, a pivot support therefor, and a catch operable to hold said signal in a plurality of signaling positions about its pivot.

4. In a direction signal, a plurality of slidable sections each normally supported independently of the others, and means connecting said sections whereby movement of an inner section causes movement of an outer section at an increased rate of speed.

5. An automobile signal including a pivoted arm composed of a plurality of telescoping sections, means for extending said sections, means for retracting said sections, said last-named means including a cable, and means for adjusting said arm on its pivot.

6. An automobile signal including a pivoted arm composed of a plurality of telescoping sections, means for extending said sections including a rack and pinion, and means for retracting said sections including a cable.

7. A signal arm comprising a plurality of telescoping sections, a cable having its ends attached to two of the sections, a pulley mounted on another of said sections, the cable passing over the pulley, and means for extending the section to which the pulley is attached.

8. A signal arm comprising a plurality of telescoping sections, a cable having its ends attached to two of the sections, a pulley mounted on another of said sections, the cable passing over the pulley, and a rack and pinion for extending and retracting the section to which the pulley is attached.

9. A signal comprising a plurality of sections, a cable having its ends attached to two of the sections, a pulley mounted on another section, the cable passing over the pulley, means for extending and retracting the section carrying the pulley, and means for retracting one of the sections to which the cable is attached.

10. A signal comprising a plurality of sections, a cable having its ends attached to two of the sections, a pulley mounted on another section, the cable passing over the pulley, means for extending and retracting the sections carrying the pulley, and a cable for retracting one of the sections to which the first-mentioned cable is attached.

H. R. BORCHARDT.